(12) United States Patent
Iida et al.

(10) Patent No.: US 7,461,572 B2
(45) Date of Patent: Dec. 9, 2008

(54) ROLLING BODY SCREW DEVICE

(75) Inventors: Katsuya Iida, Yamanashi (JP); Hironori Shouji, Yamanashi (JP); Toshiaki Kadono, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 467 days.

(21) Appl. No.: 10/544,647

(22) PCT Filed: Apr. 20, 2004

(86) PCT No.: PCT/JP2004/005604

§ 371 (c)(1),
(2), (4) Date: Aug. 5, 2005

(87) PCT Pub. No.: WO2004/094871

PCT Pub. Date: Nov. 4, 2004

(65) Prior Publication Data
US 2006/0169080 A1    Aug. 3, 2006

(30) Foreign Application Priority Data
Apr. 21, 2003  (JP) .............................. 2003-003010

(51) Int. Cl.
*F16H 25/22* (2006.01)
(52) U.S. Cl. .................................. 74/424.87; 74/89.33
(58) Field of Classification Search .............. 74/424.86, 74/424.87, 424.88, 89.33; 285/421, 373, 285/104; 403/256, 262, 335, 336, 373; 24/457, 24/458; 248/62, 74.1, 74.2, 316.1, 354.3, 248/354.4, 354.5
See application file for complete search history.

(56) References Cited

U.S. PATENT DOCUMENTS
2,380,662 A * 7/1945 Means, Jr. ................. 74/424.86

(Continued)

FOREIGN PATENT DOCUMENTS
JP      44-25696      10/1969

(Continued)

*Primary Examiner*—Richard W Ridley
*Assistant Examiner*—Doron D Fields
(74) *Attorney, Agent, or Firm*—Westerman, Hattori, Daniels & Adrian, LLP.

(57) ABSTRACT

A return pipe is constituted by combining a pair of return pipe halves split along a non-load passage. A pipe hold down member is fixed to a nut member so as to be astride the return pipe, fixing the return pipe to the nut member. A flange portion is formed on each of the return pipe halves, while a pair of fixing leg portions covering the flange portion of each return pipe half is formed on the pipe hold down member. Fastening members pass through the fixing leg portions of the pipe hold down member and the flange portion of the return pipe halves and are fastened to the nut member. When the fixing leg portions of the pipe hold down member are fixed to the nut member by the fastening members, an engagement portion of the pipe hold down member is configured to tighten the pair of the return pipe halves in the direction where split faces of the return pipe halves abut against each other.

3 Claims, 6 Drawing Sheets

U.S. PATENT DOCUMENTS

| | | | | |
|---|---|---|---|---|
| 2,780,943 | A * | 2/1957 | Stump | 74/424.87 |
| 3,143,896 | A * | 8/1964 | Edwards | 74/424.86 |
| 4,533,102 | A * | 8/1985 | Ferrell | 248/74.1 |
| 5,373,755 | A * | 12/1994 | Rohlinger | 74/424.86 |
| 7,000,493 | B2 * | 2/2006 | Fujita et al. | 74/89.44 |
| 7,040,189 | B2 * | 5/2006 | Michioka et al. | 74/424.82 |
| 2003/0062719 | A1 * | 4/2003 | Chiu et al. | 285/134.1 |
| 2003/0172759 | A1 * | 9/2003 | Hayashi | 74/424.86 |

FOREIGN PATENT DOCUMENTS

| | | |
|---|---|---|
| JP | 2004-92853 | 3/2004 |
| JP | 2004-100816 | 4/2004 |

* cited by examiner

ROLLING BODY SCREW DEVICE

TECHNICAL FIELD

The present invention relates to a rolling body screw device in which a nut member is threadedly engaged with a screw shaft through the intermediation of rolling bodies such as balls or rollers, and which converts a rotary movement of a motor to a linear movement in, for example, a worktable of a machine tool, and more specifically, to a rolling body screw device in which a substantially U-shaped return pipe is attached to a nut member to form an endless circulation path for the rolling bodies.

BACKGROUND ART

There are known various types of rolling body screw device in which an endless circulation path for rolling bodies is formed by using a so-called return pipe. Such a rolling body screw device is equipped with a screw shaft having a helical rolling groove, a nut member having a helical load rolling groove opposed to the above-mentioned rolling groove and adapted to be threadedly engaged with the screw shaft through the intermediation of rolling bodies, and a return pipe attached to this nut member to form an endless circulation path for the rolling bodies.

The return pipe is equipped with a pair of leg portions to be inserted into the nut member and a communication path portion connecting the leg portions and is formed in a substantially U-shaped sectional configuration, wherein there is formed, from one leg portion to the other leg portion, a non-load passage in which rolling bodies can roll. On the other hand, the nut member has a pair of rolling body passing holes for the insertion of the leg portions of the return pipe that are formed with the central axis of the nut member therebetween, with the rolling body passing holes being open tangentially with respect to the inner peripheral surface of the nut member. Further, these rolling body passing holes are formed so as to be spaced apart from each other by a distance corresponding to several turns of the load rolling groove. When the leg portions of the return pipe are inserted into the rolling body passing holes, each leg portion protrudes slightly from the inner peripheral surface of the nut member, scooping up the rolling bodies from the rolling groove of the screw shaft into the return pipe. Thus, the rolling bodies that have been rolling under load between the rolling groove of the screw shaft and the load rolling groove of the nut member are relieved of the load and are detached from the rolling groove of the screw shaft when they reach the position where the leg portions of the return pipe protrude, and roll inside the return pipe under a non-load state to be returned to the rolling groove through a distance corresponding to several turns. That is, by attaching the return pipe to the nut member, there is formed an endless circulation path for the rolling bodies.

As an example of the return pipe, there is known one obtained by bending an iron tube into a substantially U-shape. This, however, involves high production cost, and is subject to variation in dimension when performing the bending.

Another known example of the return pipe is formed by splitting a return pipe into two along a plane including the non-load passage for the rolling bodies to obtain a pair of return pipe halves. Formed in each return pipe half is a non-load passage of a substantially semicircular sectional configuration; by causing these return pipe halves to abut each other, a non-load passage for the rolling bodies is completed.

As shown in FIG. 7, these return pipes are fixed to a nut member 101 by using a pipe hold down member 100 formed of a metal plate. The pipe hold down member 100 is fixed to the nut member 101 by screws so as to be astride the return pipe 102, whereby the return pipe 102 is fixed to the nut member 101, with a pair of leg portions 103, 103 inserted into rolling body passing holes 104, 104.

However, the inner diameter dimension of the non-load passage provided in the return pipe is set somewhat larger than the outer diameter dimension of the rolling bodies, so that when the rolling bodies actually circulate through the endless circulation path provided in the nut member, the rolling bodies repeatedly collide with the inner peripheral wall of the return pipe when rolling in the non-load passage. In the case in which the return pipe is formed through abutment of a pair of return pipe halves, the impact force when the rolling bodies collide with the inner peripheral wall of the return pipe acts as a force to push open the abutment surfaces of the return pipe halves, and, during the circulation of the rolling bodies, this force is continuously acting on the return pipe. Thus, as the operation time of the rolling body screw device is accumulated, a gap is generated between the abutment surfaces of the return pipe halves, so that there is a fear of causing a trouble of the rolling bodies to be rolled out through this gap.

In particular, in the case of a rolling body screw device for higher load and larger thrust, the rolling bodies collide with the inner peripheral wall of the return pipe so much the more vigorously, so that the gap is likely to be generated at an early stage, which makes it necessary to reliably effect the abutment of the pair of return pipe halves against the impact force due to this collision.

DISCLOSURE OF THE INVENTION

The present invention has been made in view of the above problem. It is an object of the present invention to provide a rolling body screw device, in which, in forming a return pipe through abutment of a pair of return pipe halves obtained through splitting along a non-load passage for the rolling bodies, the abutment of these return pipe halves is effected reliably, whereby generation of a gap between the abutment surfaces of the return pipe halves during circulation of the rolling bodies is prevented, making it possible to withstand a long-term use even under a condition of high load and large thrust.

To achieve the above object, in the rolling body screw device of the present invention, a return pipe is formed through combination of a pair of return pipe halves obtained by splitting along a non-load passage, and a pipe hold down member is fixed to a nut member so as to be astride the return pipe to thereby fix the return pipe to the nut member. Further, formed on each return pipe half is a flange portion protruding in a direction crossing the non-load passage, and formed on the pipe hold down member are an engagement portion equipped with a recess to be fit-engaged with the return pipe and a pair of fixing leg portions covering the flange portions of each of the return pipe halves, with fastening members being fastened to the nut member through the fixing leg portions of the pipe hold down member and the flange portions of the return pipe halves. When the fixing leg portions of the pipe hold down member are fixed to the nut member by the fastening members, the engagement portion of the pipe hold down member exerts a tightening effect such that the split faces of the pair of return pipe halves are biased to abut each other.

According to the present invention, constructed as described above, when the rolling bodies circulate in the non-load passage path provided inside the return pipe, even if a force attributable to the collision of the rolling bodies with the inner peripheral wall of the return pipe is exerted on the abutment surfaces of the pair of return pipe halves so as to push them open, it is possible to firmly maintain the abutment state of the return pipe halves by utilizing the tightening force of the pipe hold down member. As a result, it is possible to prevent generation of a gap between the pair of return pipe halves, making it possible to achieve an increase in the service life of the return pipe even when used under a condition of high load and large thrust.

DESCRIPTION OF SYMBOLS

10 . . . outer rail, 20 . . . screw shaft, 21 . . . plurality of balls, 30 . . . inner block, 40 . . . return pipe, 50 . . . return pipe halves, 51 . . . abutment surface, 52 . . . flange portions, 60 . . . pipe hold down member, 62 . . . engagement portion, 63 . . . fixing leg portions

BEST MODE FOR CARRYING OUT THE INVENTION

In the following, the rolling body screw device of the present invention will be described in detail with reference to the accompanying drawings.

Figure 1:
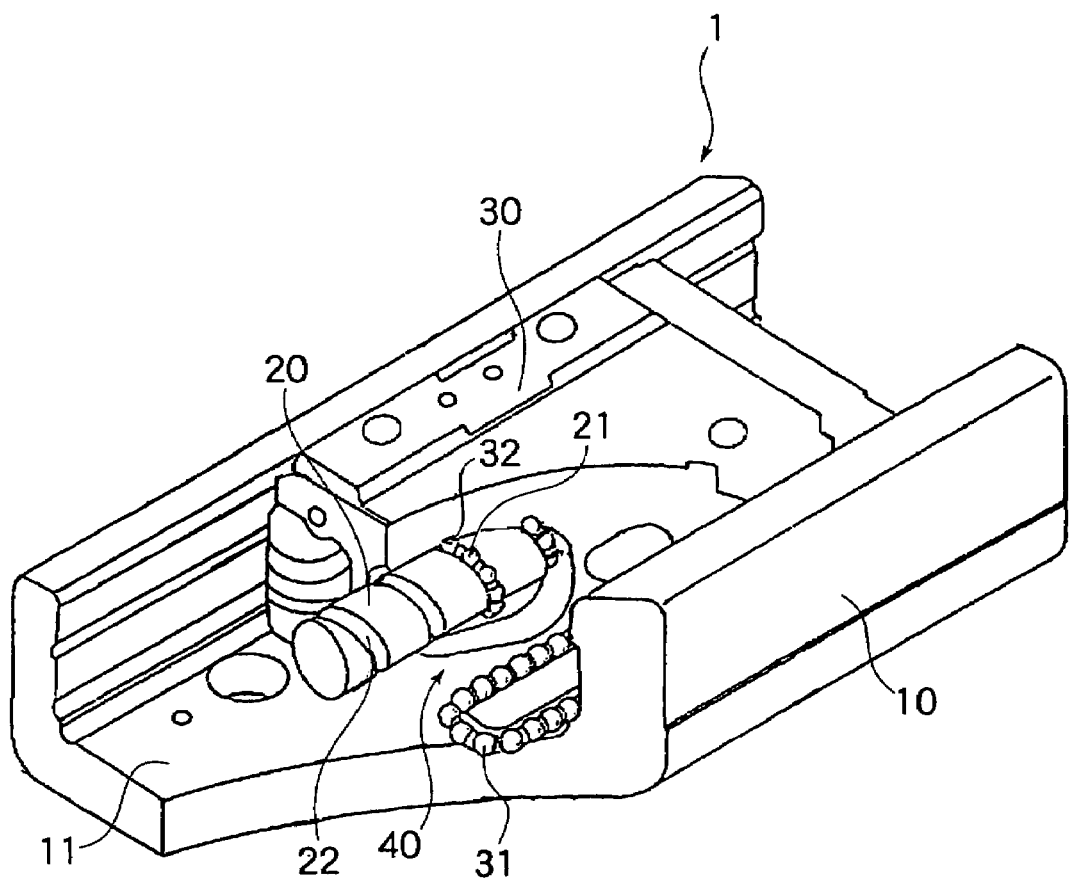
FIG. 1 is a perspective view of a linear actuator including a rolling body screw device to which the present invention is applied.

FIG. 1 shows a linear actuator 1 including a rolling body screw device to which the present invention is applied. The linear actuator 1 is composed of an outer rail 10 formed as a channel with a recessed groove 11, a screw shaft 20 rotatably provided in the recessed groove 11 of the outer rail 10, and an inner block 30 having a through-hole through which the screw shaft 20 is passed and arranged inside the recessed groove 11 of the outer rail 10.

The inner block 30 is mounted to the outer rail 10 through the intermediation of a plurality of balls 31, and the inner block 30 is equipped with an endless circulation path through which the balls 31 circulate. As a result, the inner block 30 can freely reciprocate inside the recessed groove 11 of the outer rail 10.

Further, inner block 30 is threadedly engaged with the screw shaft 20 through the intermediation of a plurality of balls 21, thus forming a ball screw device. The screw shaft 20 is rotatably supported by support brackets (not shown) provided at the both longitudinal ends of the outer rail 10, and is rotated by a motor (not shown). As a result, the inner block 30 advances and retracts within the recessed groove 11 of the outer rail 10 by an amount corresponding to the rotating amount of the screw shaft 20, making it possible to place a movable body such as a table mounted on the inner block 30 at a predetermined position.

Formed in the outer peripheral surface of the screw shaft 20 is a helical ball rolling groove 22, and formed in the inner peripheral surface of the through-hole of the inner block 30 is a load rolling groove 32 opposed to the ball rolling groove 22. The ball rolling groove 22 and the load rolling groove 32 are opposed to each other to form a load rolling path of the balls 21; when the screw shaft 20 rotates, the balls 21 roll within the load rolling path while giving load thereto. The section of the ball rolling groove 22 formed in the screw shaft 20 has a Gothic-arch-like configuration constructing of a combination of two arcs with a radius of curvature somewhat larger than the radius of the balls 21, and the load rolling groove 32 on the side of the inner block 30 is also formed in a Gothic-arch-like configuration, and the balls 21 roll within the load rolling passage while in four-point contact with the ball rolling groove 22 and the load rolling groove 32. A pre-load is imparted to the balls 21 rolling inside the load rolling passage, so that, when the inner block 30 is moved through rotation of the screw shaft 20, it is possible to prevent generation of backlash between the screw shaft 20 and the inner block 30 and to enhance the positioning accuracy in the repeated reciprocating movement of the inner block 30. As the method of imparting a pre-load, there is adopted, for example, a method in which balls (over-size balls) with a diameter slightly larger than the gap between the screw shaft 20 and the inner block 30 are selected, filling the load rolling passage.

Figure 3:
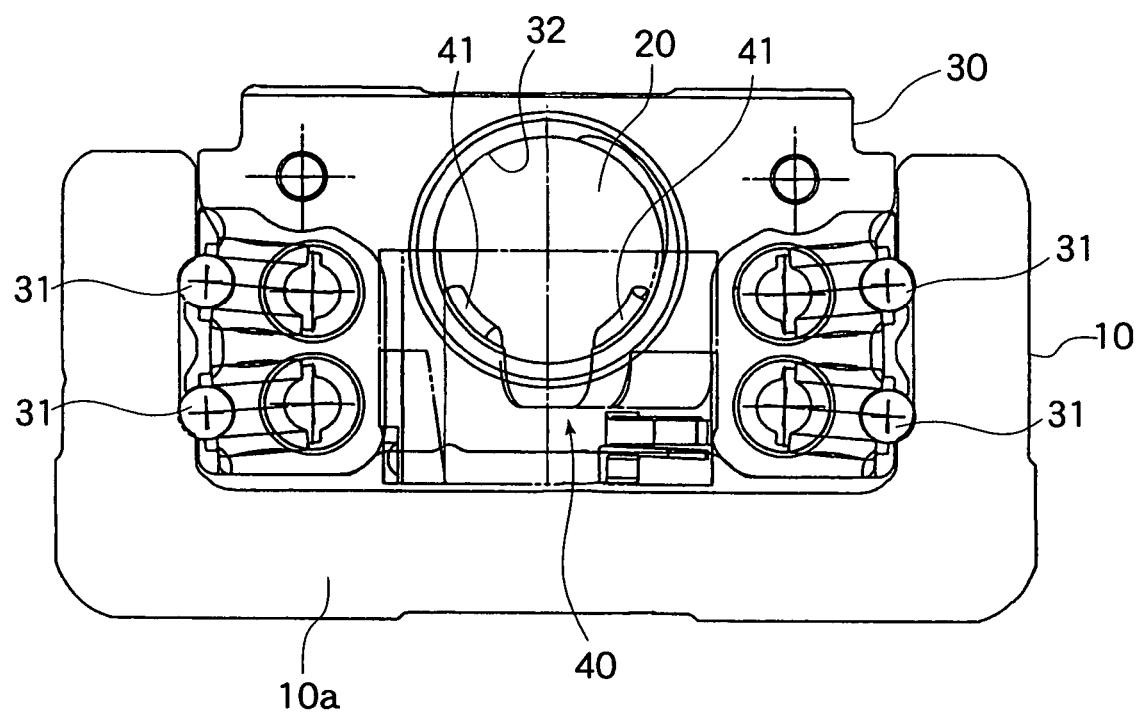
FIG. 3 is a longitudinal sectional view of the linear actuator shown in FIG. 1.

Further, mounted to the inner block 30 is a return pipe 40 establishing communication/connection between the ends of the load rolling passage. The return pipe 40 has a pair of leg portions 41, 41 and is formed in a substantially U-shaped configuration, having therein a non-load passage with an inner diameter slightly larger than the diameter of the balls 21. As shown in FIG. 3, the return pipe 40 is attached to the lower surface side of the inner block 30, that is, to the surface thereof opposed to the base portion 10a of the outer rail 10. Formed in the lower surface of the inner block 30 are a pair of ball passing holes to be fit-engaged with the leg portions 41 of the return pipe 40, and the distal end portions of the leg portions 41 of the return pipe 40 extend through the ball passing holes to slightly protrude into the through-hole of the inner block 30, the balls 21 that come rolling through the ball rolling groove 22 of the screw shaft 20 being accommodated in the non-load passage of the return pipe 40. The pair of ball passing holes into which the leg portions 41 of the return pipe 40 are inserted is formed so as to be spaced apart from each other by a distance corresponding to several turns of the helical load rolling path.

Thus, when the return pipe 40 is attached to the inner block 30, communication/connection is established between the both ends of the load rolling path through the non-load passage of the return pipe 40, thus completing an endless circulation path for the balls 21. Then, when the screw shaft 20 rotates relative to the inner block 30, the plurality of balls 21 arranged in the endless circulation path circulate through the endless circulation path.

Further, the return pipe 40 is fixed to the inner block 30 by a pipe hold down member described below. The pipe hold down member will be described in detail below.

Figure 2A:
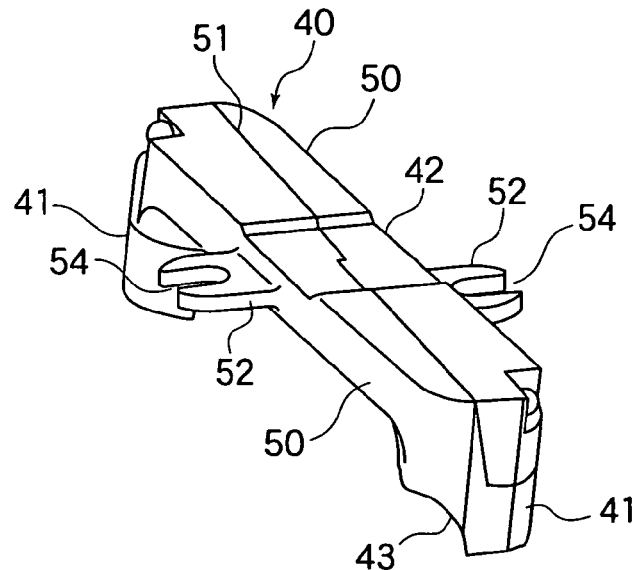
FIG. 2A is a perspective view of a return pipe of a rolling body screw device to which the present invention is applied.
Figure 2B:
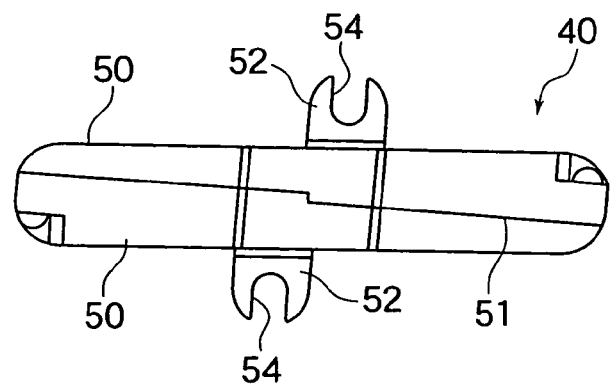
FIG. 2B is a plan view of the return pipe of the rolling body screw device to which the present invention is applied.
Figure 2C:
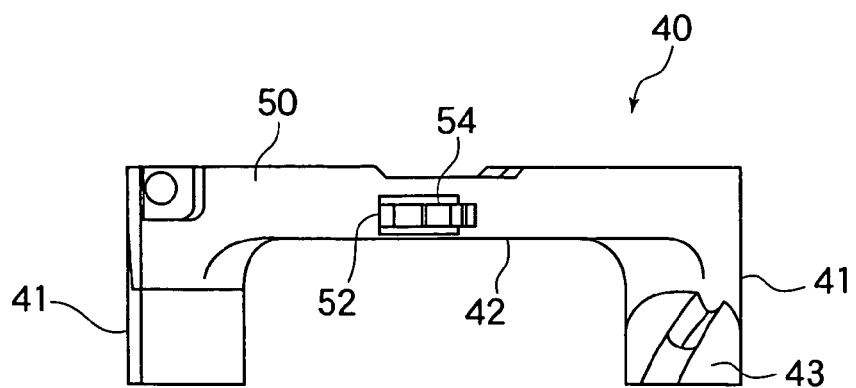
FIG. 2C is a front view of the return pipe of the rolling body screw device to which the present invention is applied.

FIGS. 2A, 2B, and 2C show the return pipe 40 in detail. The return pipe 40 constructed of a pair of return pipe halves 50, 50 having the same shape and dimension formed by injection molding of synthetic resin and abutting and opposed to each other, with the abutment surfaces 51 being bonded together by welding or the like. The return pipe 40 has a pair of leg portions 41 to be inserted into the ball passing holes of the inner block 30, and a communication passage portion 42 connecting the leg portions 41, and is formed in a substantially U-shaped configuration; the configuration of the section of the communicating passage portion 42, protruding to the lower surface of the inner block 30, taken in a direction perpendicular to the passing direction of the balls 21 is substantially rectangular, whereas the pair of leg portions 41, 41 are formed in a substantially cylindrical configuration. Further, at the distal ends of the pair of leg portions 41, 41, there are formed scoop-up portions 43 for the balls 21, and by protruding the scoop-up portions 43 from the inner peripheral surface of the through-hole of the inner block 30, it is possible to accommodate the balls 21 rolling in the ball rolling groove 22 of the screw shaft 20 in the non-load passage of the return pipe 40.

Abutment surfaces 51 of a pair of return pipe halves 50, 50, that is, the split faces of the return pipe 40 are formed along the longitudinal direction of the communication passage portion 42; strictly speaking, however, they are slightly inclined with respect to the longitudinal direction of the communication passage portion 42. Formed integrally with each return pipe half 50 is a flange portion 52 for fixing the return pipe 40 to the inner block 30. The flange portions 52 protrude sidewise from the communication passage portion 42, that is, in a direction crossing the non-load passage; as shown in FIG. 2B, in the state in which the pair of return pipe halves 50, 50 abut each other, the pair of flange portions 52, 52 are situated at different positions with respect to the longitudinal direction of the communication passage portion 42. Further, each flange portion 52 has a cutout portion 54 into which a fixing bolt 53 as a fastening member is to be inserted.

Figure 4A:
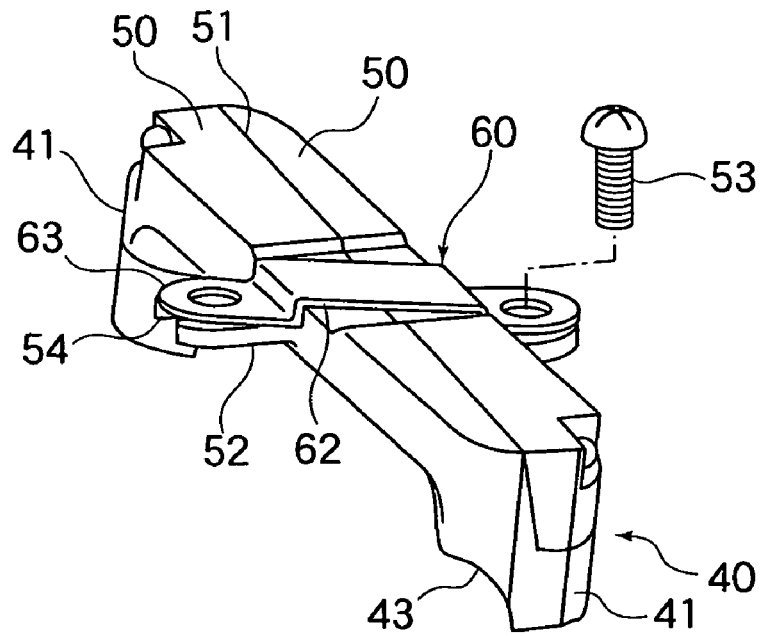
FIG. 4A is a perspective view showing a relationship between the return pipe shown in FIG. 2 and a pipe hold down member.
Figure 4B:
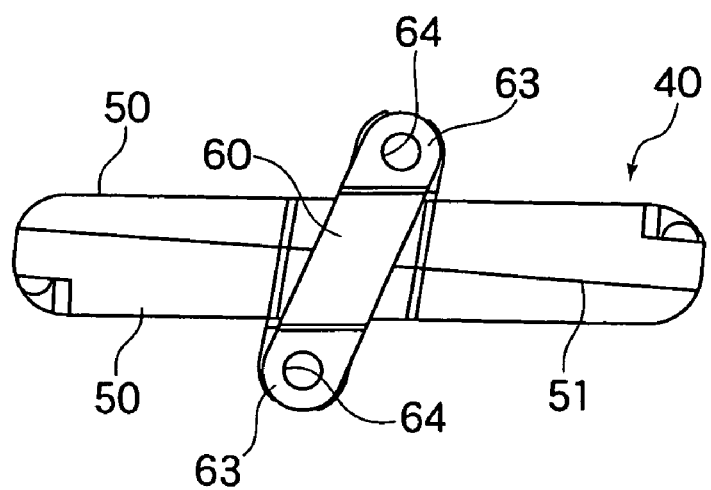
FIG. 4B is a plan view showing the relationship between the return pipe shown in FIG. 2 and the pipe hold down member.

FIGS. 4A and 4B show a state in which a pipe hold down member 60 is attached to the return pipe 40. The pipe hold down member 60 is formed by bending a metal plate, and, by fastening the fixing bolts 53 to the inner block 30, it is fixed to the inner block 30 so as to be astride the return pipe 40, fixing the return pipe 40 onto the inner block 30. The pipe hold down member 60 is provided with an engagement portion 62 equipped with a recess 61 to be engaged with the return pipe 40, and, a pair of fixing leg portions 63, 63 are formed at the both ends of the engagement portion 62 so as to be continuous thereto, with each fixing leg portion 63 being formed so as to overlap the flange portion 52 of the return pipe half 50 to cover the same.

Each fixing leg portion 63 has a through-hole 64 through which the fixing bolt 53 is to be passed, and the through-holes 64 overlap the cutout portions 54 formed in the flange portions 52 of the return pipe halves 50. Thus, as shown in FIGS. 4A and 4B, when the fixing bolts 53 are fastened to the inner block 30 from above the fixing leg portions 63, it is possible to fix the pipe hold down member 60 and the return pipe 40 together to the inner block 30. In particular, the return pipe halves 50 are formed of synthetic resin, so that, when the fastening bolts 53 are directly fastened from above the flange portions 52, the head portions of the fixing bolts 53 will cut into the flange portions 52, which means there is a fear of the return pipe 40 not being fixed with sufficient firmness. However, by covering the flange portions 52 of the return pipe halves 50 with the fixing leg portions 63 of the metal pipe hold down member 60, and fastening the fixing bolts 53 from above the same, it is possible to exert the fastening force of the fixing bolts 53 sufficiently on the flange portions 52 of the return pipe halves 50, making it possible to firmly secure the return pipe 40 in position.

Figure 5:
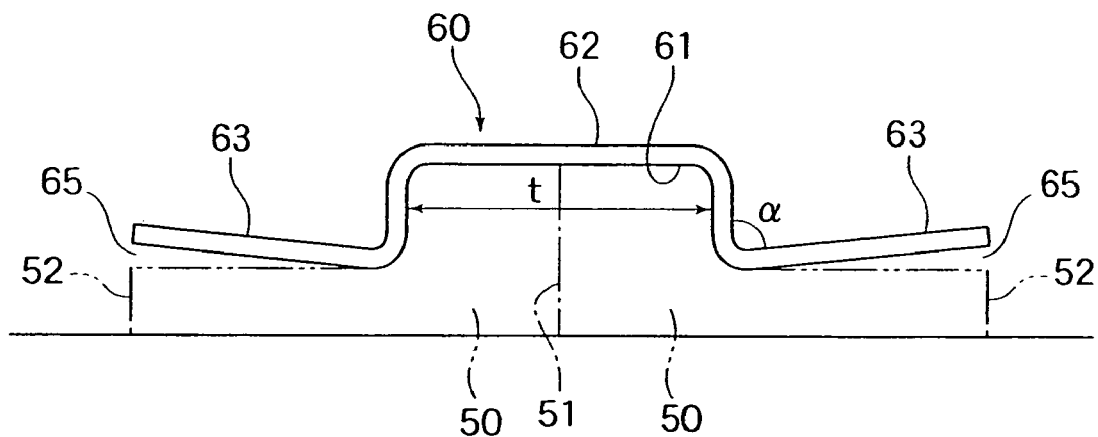
FIG. 5 is a front view of the pipe hold down member of the present invention.

FIG. 5 is a diagram showing the specific configuration of the pipe hold down member 60. The pair of fixing leg portions 63, 63, with which the pipe hold down member 60 is equipped, are formed so as to be inclined such that each of their distal end portions extends away from the flange portions 52 of the return pipe halves 50. That is, after the engagement portion 62 of the pipe hold down member 60 has been fit-engaged with the return pipe 40, in the state in which the fixing bolts 53 have not been fastened yet, there are formed, as shown in FIG. 5, wedge-like gaps 65 between the distal end portions of the fixing leg portions 63 and the flange portions 52. In this embodiment, the pipe hold down member 60 is formed such that the engagement portion 62 and the fixing leg portions 63 are at an acute angle $\alpha$ with respect to each other.

By thus forming the wedge-like gaps 65 between the fixing leg portions 63 of the pipe hold down member 60 and the flange portions 52 of the return pipe halves 50, when the fixing bolts 53 are fastened from above the fixing leg portions 63 to forcibly bring the fixing leg portions 63 and the flange portions 52 into close contact with each other, the engagement portion 62 of the pipe hold down member 60 undergoes elastic deformation so as to tighten the return pipe 40. As a result, the pair of return pipe halves 50, 50 opposed to each other are tightened from outside through the deformation of the pipe hold down member 60, and the two are caused to firmly abut each other at the split faces 51 thereof.

Thus, solely by fastening the fixing bolts 53 to fix the pipe Hold down member 60, it is possible to cause the return pipe halves 50, 50 to firmly abut each other; thus, even when the balls 21 roll Vigorously through the non-load passage of the return pipe 40, it is possible the prevent generation of a gap between the abutment surfaces 51 of the return pipe halves 50, 50.

Figure 6:
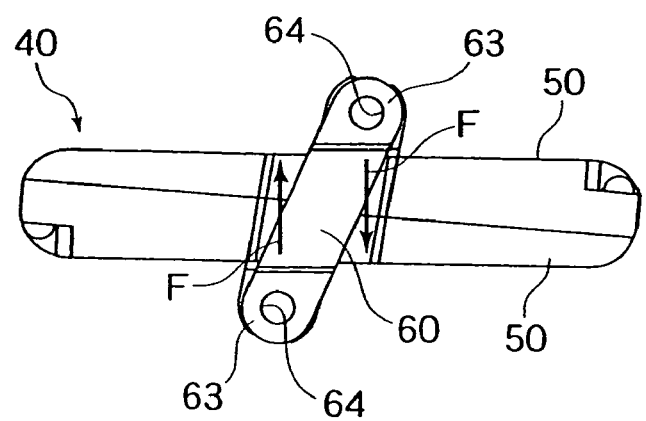
FIG. 6 is a plan view showing the direction in which the tightening force of the pipe hold down member is exerted.
Figure 7:
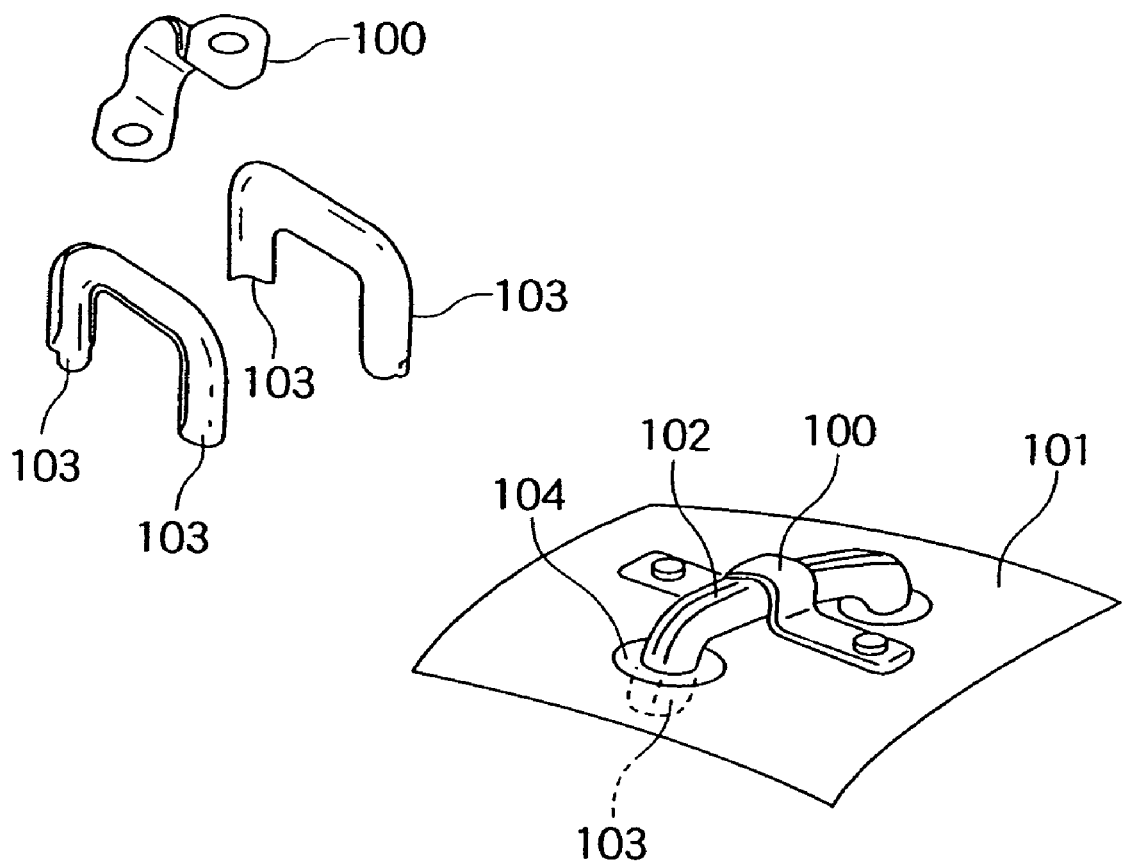
FIG. 7 is a perspective view of the mounting structure of a conventional return pipe.

Further, the flange portions 52 formed on each of the return pipe halves 50, 50 are situated and protruded at positions deviated from each other with respect to the longitudinal direction of the non-load passage, and as shown in FIG. 4B, the pipe hold down member 60 is fixed so as to be obliquely astride the return pipe 40. Thus, as shown in FIG. 6, the above-mentioned fastening force F of the pipe hold down member 60 acts as a couple of forces on the return pipe 40, making it possible to cause the pair of return pipe halves 50, 50 to abut each other more firmly.

Further, by making the width t of the recess 61 of the engagement portion 62 of the pipe hold down member 60 slightly smaller than the width of the return pipe 40, and by forming the recess 61 so that the recess slightly expands toward the return pipe 40, as described above, when the fixing bolts 53 are fastened from above the fixing leg portions 63 of the pipe hold down member 60, it is possible to cause the engagement portion 62 to tighten the return pipe 40 more strongly, and to cause the return pipe halves 50, 50 to abut each other more firmly.

Thus, in accordance with the present invention, when the pipe hold down member 60 is fixed to the inner block 30 by using the fixing bolts 53 constituting the fastening members, the pipe hold down member 60 tightens the return pipe 40, and the return pipe halves 50, 50 opposed to each other are caused to abut each other firmly. As a result, even if the balls 21 roll vigorously through the non-load passage in the return pipe 40, no gap is generated between the abutment surfaces 51 of the return pipe halves 50, making it possible to achieve an increase in the service life of the return pipe 40. Further, even a return pipe formed of synthetic resin, which is subject to deformation, can be used in a ball screw device of high load and large thrust.

While in the above embodiment balls are used as the rolling bodies, it is also possible to apply rollers such as cylindrical rollers. Further, while in the above example the nut member is shown as an inner block of a substantially rectangular sectional configuration, the present invention is also applicable to a cylindrical nut member.

The invention claimed is:

1. A rolling body screw device, comprising:
    a plurality of rolling bodies;
    a screw shaft having in an outer peripheral surface thereof a helical rolling groove in which the rolling bodies roll;
    a nut member having a through-hole through which the screw shaft is passed and having in an inner peripheral surface of the through-hole a helical load rolling groove forming a load rolling path for the rolling bodies together with the rolling groove;
    a return pipe having a non-load passage for the rolling bodies, the return pipe having a pair of return pipe halves split in the direction in which the non-load passage extends, with communication being established between both ends of the load rolling path to form in the nut member an endless circulation path for the rolling bodies;
    a pipe hold down member fixing the return pipe to the nut member so as to be astride the return pipe; and
    fastening members for fixing the pipe hold down member to the nut member,
    wherein each return pipe half has a flange portion protruding in a direction crossing the non-load passage, whereas the pipe hold down member has an engagement portion equipped with a recess to be fit-engaged with the return pipe and a pair of fixing leg portions covering the flange portions of the return pipe halves, with the fastening members being passed through the fixing leg portions of the pipe hold down member and the flange portions of the return pipe halves to be threadedly engaged with the nut member; and
    wherein, when the fixing leg portions of the pipe hold down member are fixed to the nut member by the fastening members, the engagement portion of the pipe hold down member tightens the pair of the return pipe halves so as to cause the split faces of the return pipe halves to abut each other, and
    wherein the pair of the fixing leg portions provided on the pipe hold down member are formed such that their distal end portions are inclined so as to extend away from the flange portions of the return pipe halves; and that, when the pair of the fixing leg portions are forcibly fixed to the flange portions of the return pipe halves by the fastening members, the engagement portion of the pipe hold down member undergoes elastic deformation so as to tighten the return pipe.

2. A rolling body screw device according to claim 1, wherein the pipe hold down member is formed by bending a metal plate.

3. A rolling body screw device according to claim 1, wherein the pipe hold down member is arranged so as to be astride the return pipe crossing the split faces of the return pipe halves obliquely; and that the force with which the engagement portion of the pipe hold down member tightens the return pipe halves acts on the pipe hold down member as a couple of forces.

* * * * *